3,092,537
FLAMEPROOFING OF ORGANIC MATERIALS
Theodorus G. Brandts, Grand'Mere, Quebec, Canada, assignor to Consolidated Paper Corporation Limited, Grand'Mere, Quebec, Canada
Filed June 5, 1959, Ser. No. 818,462
14 Claims. (Cl. 162—159)

This invention relates to the flameproofing of organic materials, for example cellulosic and related materials, containing phenolic substances such as tannins, phlobaphenes, lignin and the like, by the introduction of a halogen. In its most important aspect it relates to the flameproofing, in situ, of cellulosic-fibrous materials of the wood, fruit, leaf, stem and seed hair class and to such related or derived materials as whole bark, bark fiber, bark cork, pulps and wood particles.

Present flameproofing methods depend on impregnating or coating the organic material with solutions or dispersions of flameproofing agents.

Many water soluble salts are used: ammonium bromide, -molybdate, -sulfate, -chloride, -borate, -phosphate, and sodium stannate, -aluminate, -silicate, etc.

Water insoluble flameproofing agents used are ferric oxide, ferric chromate, lead oxide, lead chromate, etc. Here the multiple-bath method of flameproofing is often used. The organic material is first impregnated with water soluble salts and then passed through a second bath in which a precipitant is used. Alternately one reactant, dissolved in a nonpolar solvent, is used as the impregnating agent. The solvent is removed by drying after which the treated material is brought into contact with water on which precipitation or ionization of the insoluble flameproofing agent takes place.

More recently there have been a number of publications disclosing the use of organic materials as flameproofing agents. Chlorinated and brominated paraffins, rubbers, phenols, naphthalene or other chlorine or bromine containing organics have been suggested as flameproofing impregnating or coating agents. Organic phosphates such as amine phosphates and brominated allyl phosphate proved to be effective flameproofing agents.

Chemical combination of cellulosic material with the flameproofing agents has also been extensively investigated. Titanium and antimony are believed to react with cellulose to give fire resistant products. Treatment with titanium oxychloride-antimony trichloride solutions is preferred. Partial chemical modification of cellulose by a phosphate-urea produces satisfactory results. It appears that phosphoric acid reacts with cellulose to form fire resistant products; urea or amines such as melamine, dicyandiamide, formamide and the like, act as a buffer and swelling agent and prevent degradation of the cellulosic material by the phosphorylation.

Some of the methods above are suitable to the higher priced textiles, where the relatively high cost of the treatment is not a serious deterrent. There is, however, a large demand for a relatively inexpensive and effective flameproofing process for lower priced products especially those of the fibrous cellulosic variety such as fiberboard, hardboard, particle board, insulating wool and the like. But, when considering the present less expensive methods for this field, the main drawbacks are that the fire retardant agents are easily washed out or the fire resistant properties are not lasting or effective under a variety of conditions.

Briefly, the process of the present invention involves the halogenation (in situ) of the organic material to be flameproofed, followed, if necessary, by a washing out and/or a neutralization of those soluble acidic products of the halogenation reaction which might later have a harmful effect. While flameproofing by bromination is often more effective than by chlorination, the latter, mainly because of cost, is the preferred form of halogenation. The preferred neutralizing agent is ammonia; lime can, under certain conditions, be found to be especially effective.

The present invention has the following advantages: (a) it is relatively simple; (b) the cost of treatment is low; (c) the main flameproofing components remain an insoluble integral part of the material being flameproofed, such that subsequent water leaching does not seriously impair its fire resistant properties (see Example 6 below); (d) by a proper choice of neutralizing agent, the overall fire-resistant properties can be further improved, for example, use of ammonia or lime markedly improves glow resistance (see Example 6, below); (e) in some applications, other properties of the material are improved, for example, after flameproofing insulating boards, the modulus of rupture is improved substantially (see Examples 8 and 9, below), fungicidal, bactericidal and insecticidal properties, too, are improved.

Many cellulosic-fibrous products and related materials contain phenolic substances such as tannins, phlobaphenes, lignin and the like. It has been found that, under suitable conditions, chlorine or bromine reacts rapidly with the phenolic material in these materials to give substitution and possibly addition products which act as fire retardants. For example, when a piece of wood (white pine) was wetted, chlorinated at room temperature, and exposed to the open flame of a Bunsen burner, it did not catch fire; on the other hand, when a similar piece of wood at the same moisture content, but untreated, was exposed to the flame for the same period of time, it caught fire and burned down to ashes. Similar observations were made for such materials as wood pulp, straw and bark pulps, bark cork and the like; in these cases, all the materials showed a remarkable fire resistance when exposed to the open flame. The same effect was noticed when some of the reaction products, mainly hydrochloric acid or hydrobromic acid were neutralized with an alkali such as sodium hydroxide, ammonia and calcium hydroxide, etc. In the case of ammonia and calcium hydroxide, however, it was found that the glow resistance of the halogenated material was improved.

To evaluate the fire retardant properties quantitatively the following test was devised as other known tests were too elaborate or too cumbersome for a rapid evaluation of these properties: since the density of a material has a great influence on its fire retardancy, samples were reduced to pellets, 3/8" thick by 1/4" in diameter with a density of about 60 lb. per cubic foot, by pressing one gram samples (10% moisture) in a die at 40,000 p.s.i. in a hydraulic press. For each fire test, four pellets were oven dried for 2 hours at 105° C. and the dry weights recorded. The pellets were placed longitudinally on two parallel connected and parallel placed spring loaded No. 22 Nichrome V resistance wires which were 0.20" apart and ignited by sending a 16 ±0.2 amp. 220 volt electrical current through the wires for a period of 3 minutes and 30 seconds. This current and ignition time guaranteed a total combustion of all untreated organic material. After burning and afterglow had stopped the pellets were dropped into aluminum dishes and the residual weight determined. The residual bone dry weight expressed as a percentage of the original weight was taken as a measure of the fire retardancy. Within each fire test these percentages varied remarkably little and only in some cases where the pellets were on the border line of catching fire or not could a larger spread be noticed. Results of such tests are given below.

The process and the advantages of the present invention will be illustrated by the following examples. It is understood that these examples in no way limit the invention.

In the drawings, which illustrate specific examples of the invention as set out below:

*Example 1*

A rectangular piece of pine wood of 1" x 1" x 3", moisture content approximately 20%, was kept in a chlorine atmosphere for thirty minutes. The colour of the wood changed to an orange-yellow. The residual chlorine in the container was removed and gaseous ammonia allowed to enter. The colour of the wood changed to brown. After the neutralization was completed—after about three minutes—the sample was dried and conditioned to about 7% moisture content. This sample was exposed to the flame of a Bunsen burner for a period of 2 minutes. When the burner was removed, flaming stopped within 5 seconds; the duration of afterglow was about ten seconds. An untreated, but similar piece of wood kept burning for four minutes; the duration of the afterglow was about one minute.

*Example 2*

100 gram samples of the following material were chlorinated at a moisture content of 50%.

(a) *Straw.*—Oat straw was treated in an attrition mill equipped with spiked tooth plates. The average length of the straw particles was about ¼".

(b) *Wood particles.*—Spruce chips were processed in a hammermill to obtain particles with an average length of ¼".

(c) *Groundwood.*—A coarse spruce-balsam groundwood with a Canadian standard freeness of 430 cc.

(d) *Bark fibers.*—Spruce-balsam fibers, containing a small amount of wood fibers and cork.

The chlorinations were performed in a rotating, 5 liter, round-bottom flask. The chlorine was introduced at a known constant rate through a Teflon gland with neoprene O-ring. The round-bottom flask was equipped with a calcium-chlorine and sodium hydroxide tube through which the displaced air and possible hydrochloric acid and water vapour had to pass. The amount of introduced chlorine was determined by weighing the flask plus material before and after chlorination. The round bottom flask was cooled to keep the chlorination temperature constant at 20°±2° C.

The chlorinated products were divided into two equal portions; one part was dried at 105° C.; the other part was treated with ammonia gas to neutralize the hydrochloric acid formed during chlorination.

One gram samples of air-dry material were pressed into pellets and fire tested on electrically heated wires as described above. The results are given in the table below.

| Raw material | Percent chlorine introduced B.D. basis | Percent residue after fire testing | |
|---|---|---|---|
| | | Not neutralized | Neutralized with ammonia |
| Straw | 0 | 2 | 2 |
| Do | 8 | 65 | 56 |
| Groundwood | 0 | 0.5 | 0.5 |
| Do | 4 | 21 | 25 |
| Wood particles | 0 | 0.5 | 1 |
| Do | 4 | 56 | 57 |
| Do | 10 | 65 | 62 |
| Bark fibers | 0 | 4 | 4 |
| Do | 4 | 41 | 54 |
| Do | 8 | 65 | 60 |

*Example 3*

Figure 1:
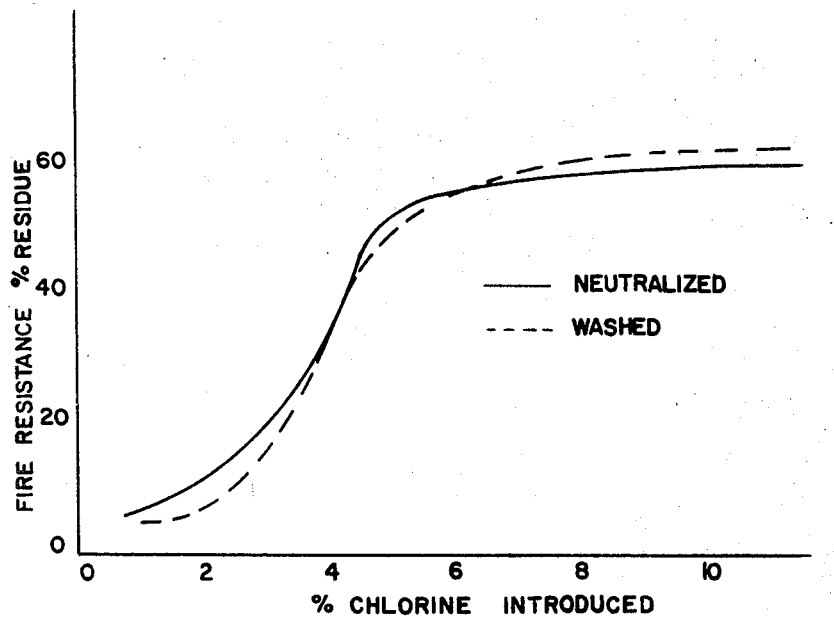
FIGURE 1 is a graph showing the fire resistance of material chlorinated as set out in Example 3.

100 gram samples of a coarse groundwood with a Canadian standard freeness of around 450 cc. were chlorinated as described in Example 2. The moisture contents of all samples were 77%. 1.0%, 2.3%, 3.2%, 3.9%, 5%, 6.3% and 10.3% chlorine, calculated on B.D. fibers, was introduced. Each chlorinated sample was divided into two portions. One portion was washed with water until the wash water had reached a pH of 3.5 to 4 and most of the hydrochloric acid, formed during chlorination had been removed. The other part was neutralized by blowing ammonia gas over it. One gram samples of the air-dry material were pressed into pellets and fire tested as described before. The results are illustrated in FIGURE 1 of the accompanying drawings.

*Example 4*

100 gram samples of the following materials were brominated at a moisture content of approximately 50%.

(a) Spruce-balsam wood wafer-like chips.

(b) Pine wood wafer-like chips.

(c) Spruce-balsam wood particles. Spruce chips were processed in a hammermill to obtain particles with an average length of ¼".

(d) Poplar wood particles. Spruce chips were processed in a hammermill to obtain particles with an average length of ¼".

Figure 2:
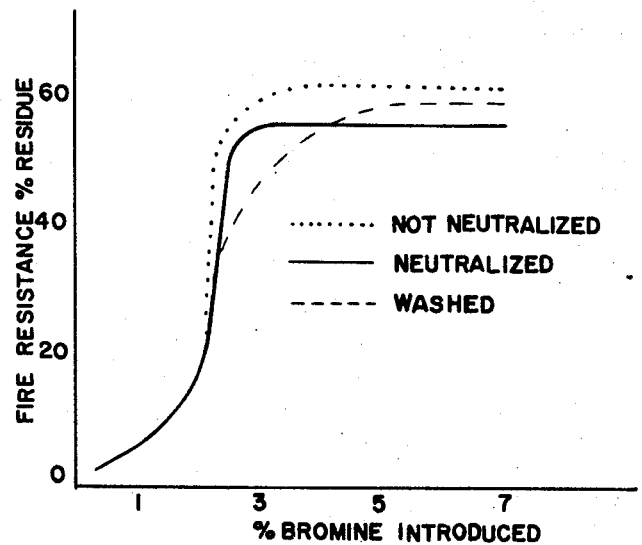
FIGURE 2 is a graph showing the fire resistance of material brominated as set out in Example 4.

The brominations were performed in a rotating 5 liter, round-bottom flask. Known amounts of bromine were introduced at a constant rate to give 1.0, 2.0, 3.0 and 6.0% bromine on wood (B.D. basis). The brominated products were split into three equal portions. One part was dried at 105° C.; the second part was washed with water until the wash water had reached a pH of 3.5 to 4.0, and most of the hydrobromic acid formed during the bromination had been removed; the third part was neutralized by blowing ammonia gas over it. One gram samples of air-dry material were pressed into pellets and fire tested as described before. In all cases good fire resistance (50% residue or more at 3% bromine calculated on B.D. material) was obtained. This is illustrated for wood particles in FIGURE 2 of the accompanying drawings. The other samples showed similar results.

*Example 5*

100 gram samples of the following materials were brominated at a moisture content of approximately 77%.

(a) Spruce-balsam groundwood pulp.

(b) Poplar groundwood pulp.

(c) Straw pulp.

(d) Bark fiber pulp.

Figure 3:
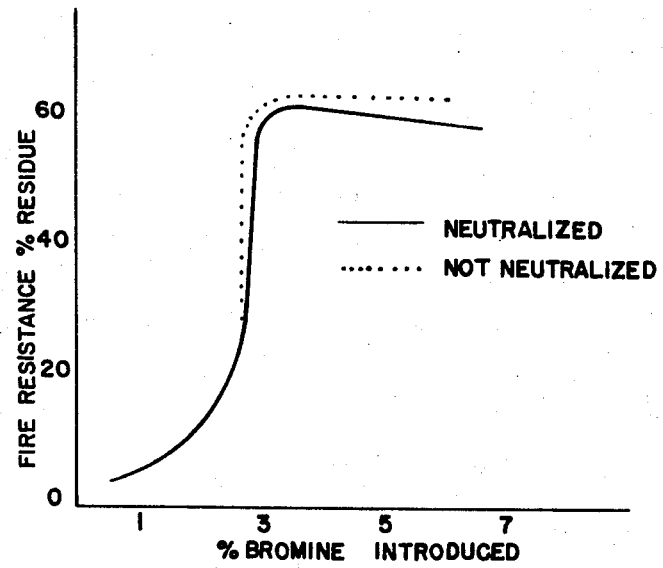
FIGURE 3 is a graph showing the fire resistance of material brominated as set out in Example 5.

The brominations were performed as described in Example 4. The brominated products were split into two portions. One portion was dried in the oven, another portion was neutralized with ammonia before drying. One gram samples were pressed into pellets and fire tested as described before. In all cases good fire resistance (50% residue or more at 3% bromine calculated on B.D. material) was obtained. This is illustrated for bark fibers in FIGURE 3 of the accompanying drawings. The other samples showed similar results.

*Example 6*

200 gram samples of the following materials were chlorinated at a moisture content of 40%.

(a) Redwood bark fibers.

(b) Douglas fir wood fibers.

(c) Spruce-balsam bark fibers.

All these fiber samples were shredded and defibered so as to make them suitable for insulating purposes (insulating wool, insulating pads, etc.). The chlorinations were performed at room temperature in a rotating, 5 liter round-bottom flask. The chlorine was introduced through a Teflon gland and neoprene O-ring by means of a large calibrated gas burette. By raising a levelling bottle filled with a chlorine-saturated calcium chloride solution a known amount of chlorine was measured into the reaction flask at a constant rate from the burette. The chlorinated bark fibers were neutralized with known amounts of gaseous ammonia in the same way (using paraffin oil in place of the calcium chlorine solution).

After chlorination and neutralization all samples were oven dried at 300° F. and conditioned at 50% R.H. and 72° F. Uncompacted samples of ¾" cube at a density of approximately 4–5 lbs./cu. ft. were placed on two parallel, spring loaded, No. 22 Nichrome V resistance wires, which were ½" apart. The samples were ignited by sending a 22±0.2 amp., 220 v. electrical current through the wires for ten seconds. Treated insulating wool samples were also leached in water for 3 hours, dried and conditioned before testing. The results of these tests are given in the table below.

If the sample had not caught fire after ten seconds the current was kept on until the sample started burning. Recorded were:

(a) *Ignition time in seconds.*—The length of time elapsed from the moment the current was switched on to the moment the sample started flaming.

(b) *Flame time in seconds.*—The length of time the sample was flaming.

(c) *Glow time in seconds.*—The length of time elapsed from the moment flaming stopped to the moment glowing stopped.

For the fire testing of these boards, strips of 1" wide and 3" long were cut and placed longitudinally on two parallel, spring loaded, No. 22 Nichrome V resistance wires, which were ½" apart. The strips were ignited by sending a 22±0.2 amp., 220 v. electrical current through the wires. All board samples containing 4% chlorine and more showed good fire resistance and many samples did not catch fire after an ignition time of as long as 30 seconds. All untreated boards burned to ashes after an ignition time of 4 to 10 seconds.

*Example 8*

Insulting board wet laps of 12" x 18", made from commercial insulating board pulp (mainly groundwood), at moisture contents varying from 10 to 70%, were contacted with chlorine for different lengths of time, varying from ten seconds to 15 minutes at various temperatures, varying from 70° F. to 160° F.

After chlorination the boards were neutralized with gaseous ammonia and dried in a convention oven at 300° F.

After conditioning the boards were cut into strips 1" wide and 3" long and fire tested as described in Example 7.

Recorded were (a) the time (in seconds) the sample was exposed to the heated wires until it caught fire, (b) the maximum exposure time without burning the sample to ashes. Strips were also leached in water for 8 hours, dried and conditioned before testing. The flexural strength

| Material | Chlorine added (B.D. basis) | | | | | | | | | | | | | | | | | |
|---|---|---|---|---|---|---|---|---|---|---|---|---|---|---|---|---|---|---|
| | 0% | | | 5% | | | 7% | | | 9% | | | 11% | | | 13% | | |
| | a | b | c | a | b | c | a | b | c | a | b | c | a | b | c | a | b | c |
| Redwood bark wool | 6 | 14 | 44 | 23 | 2 | 13 | (¹) | 0 | 10 | (¹) | 0 | 10 | (¹) | 0 | 3 | (¹) | 0 | 5 |
| Soaked | | | | 8 | 3 | 7 | 8 | 2 | 7 | 11 | 1 | 8 | 24 | 3 | 13 | | | |
| Douglas fir wood wool | 6 | 27 | 13 | 7 | 25 | 6 | 8 | 4 | 9 | 15 | 5 | 12 | 26 | 6 | 2 | 37 | 3 | 0 |
| Soaked | | | | 8 | 35 | 15 | 7 | 33 | 6 | 7 | 18 | 6 | 9 | 15 | 4 | 9 | 11 | 7 |
| Spruce-balsam bark wool | 6 | 20 | 42 | | | | 16 | 5 | 10 | 30 | 7 | 5 | (¹) | 0 | 10 | (¹) | 0 | 5 |
| Soaked | | | | | | | | | | 8 | 6 | 12 | 10 | 4 | 7 | | | |

¹ Samples did not catch fire but were carbonized after approximately 60 seconds.

*Example 7*

2,000 gram samples of the pulps mentioned in Example 5 were chlorinated at a consistency of approximately 3%. The reaction vessel comprised a three liter, three-necked, round-bottom flask equipped with a gas diffuser and stirrer. The chlorine was measured by means of a large calibrated gas burette and introduced into the reaction flask at a constant rate by raising a levelling bottle filled with a chlorine-saturated calcium chloride solution. The chlorination temperature was left constant at 20°±2° C. After chlorination the pulps were treated in the following ways:

(a) Washed with water until pH of wash water had reached a value between 3.5 and 4.

(b) Neutralized with ammonia to a pH of approximately 4.

(c) Neutralized with sodium hydroxide to a pH of approximately 4.

(d) Neutralized with a calcium hydroxide suspension to a pH of approximately 4.

(e) Washed with water and neutralized with a calcium hydroxide suspension to a pH of approximately 4.

The treated pulps were formed into a wet mat on a 14-mesh screen in a Buchner funnel and drained under vacuum. The boards were removed and pressed between two wire screens in a hydraulic press, dried in a convention oven and conditioned for 24 hours at 50% R.H. and 72° F. The final caliper of all boards was approximately ½". The density of the boards was varied from 10 to approximately 25 lbs./cu. ft.

of the boards was determined according to ASTM Standard D1037–55T.

In the tables below a few of the results are summarized.

| Board No. | Percent chlorine in board B.D. basis | Chlorination temp., °F. | Moisture content at chlorination, percent | Chlorination time in minutes |
|---|---|---|---|---|
| Control | 0 | | | |
| 1 | 0.5 | 80 | 67 | 2 |
| 2 | 1.5 | 72 | 65 | 5 |
| 3 | 7.0 | 72 | 67 | 10 |

| Board No. | Density, lbs./cu. ft. | Caliper | Modulus of rupture, p.s.i. |
|---|---|---|---|
| Control | 16.9 | 0.526 | 421 |
| 1 | 16.0 | 0.540 | 425 |
| 2 | 16.2 | 0.532 | 530 |
| 3 | 16.4 | 0.567 | 570 |

| Board No. | Percent chlorine in board B.D. | (a) Exposure time until catching fire (sec.) | (b) Maximum exposure time (sec.) |
|---|---|---|---|
| Control | 0 | 6 [6] | 5 [5] |
| 1 | 0.5 | 13 [10] | 10 [7] |
| 2 | 1.5 | 24 [10] | 15 [15] |
| 3 | 7.0 | 35 [12] | 32 [20] |

NOTE.—Figures between brackets are values obtained after strips had been soaked in water for 8 hours.

Example 9

Insulating board wet laps of 12″ x 18″ made from a pulp, consisting mainly of the fibrous fraction of wood bark, were chlorinated, neutralized and tested under the conditions described in Example 8. In the table below a few of the results are summarized. Board made from straw pulp behaved in a similar fashion.

| Board No. | Chlorination conditions | | | | Physical properties | | | Fire testing | |
|---|---|---|---|---|---|---|---|---|---|
| | Temp., °F. | Time, min. | M.C. of board, percent | Percent chlorine in board, B.D. basis | Density, lbs./cu. ft. | Cal., in. | M. of R., p.s.i. | (a) Exposure time until catching fire, sec. | (b) Maximum exposure time, sec. |
| Control | | | | | 20 | 0.510 | 410 | 6 [6] | 9 [7] |
| 1 | 72 | 2 | 68 | 0.6 | 19.8 | 0.512 | 416 | 14 [12] | 14 [12] |
| 2 | 72 | 5 | 67 | 2.0 | 20.1 | 0.500 | 510 | 24 [12] | 70 [50] |
| 3 | 100 | 3 | 52 | 4.0 | 20.1 | 0.505 | 560 | 36 [18] | 110 [80] |

NOTE.—Figures between brackets are values obtained after strips had been soaked in water for 8 hours.

Example 10

Sheets of paper and paperboard, made from a variety of groundwood, kraft, bark fiber stocks and mixtures thereof, at a moisture content of approximately 60% by weight, were contacted at room temperature with chlorine and chlorine-air mixtures for different lengths of time and neutralized with gaseous ammonia.

After drying and conditioning the sheets were cut into strips of 2¾ in. in width and 8¼ in. in length and suspended with long axis in a vertical position. A test flame was applied to the lower edge of the specimen for 12 seconds after which the length of char and the duration of afterglow were reported. Papers having an average char length of less than 4½ in. are generally classed as flameproof. This testing procedure is described in A.S.T.M. Standard Method D777–46 and TAPPI Standard Method T461m–48.

In the table below a few of the results are summarized.

| Stock composition | Percent chlorine B.D. basis | Caliper, in. | Length of char., in. | Afterglow, sec. |
|---|---|---|---|---|
| 100% bark fibers | 20 | 0.012 | 3 | 1 |
| Do | 10 | 0.020 | 3 | 0 |
| Do | 5 | 0.060 | ¼ | 0 |
| 30% groundwood, 70% bark fibers | 10 | 0.025 | 4 | 0 |
| Do | 5 | 0.025 | 7 | 1 |
| 70% groundwood, 30% bark fibers | 5 | 0.060 | 4 | 2 |
| 70% kraft, 30% bark fibers | 5 | 0.060 | 3 | 2 |

As the examples show, the effectiveness of the present flameproofing process varies with several factors, many of which are at the discretion of the user of the process, such factors, for example, as type of material to be treated, type of halogenating agent, degree of halogenation, type and degree of neutralization, density of product, etc. And each factor in turn is somewhat dependent on the other. Thus the actual method of applying the present invention will have to be worked out for each specific product using known technical skills. The basic step of the process is that of halogenation; the steps of washing and/or neutralization are somewhat dependent on the product desired and the uses to which it will be put.

One of the most important applications of the present invention will be in the wall board and especially the insulating board field. Examples 8 and 9 above illustrate the use of halogenated straw, bark and wood fibers in these boards. Other boards were made where the density was varied from 10 to 25 lbs./cu. ft.; the results were similar to those shown in the examples.

A practical way of fireproofing wall board would be to chlorinate the wet board and neutralize it with gaseous ammonia, after the board has left the forming or press roll section and before it enters the drying kiln or hydraulic press, or the board could be chlorinated and neutralized in a section of the kiln. The advantages of this method would be: (a) complete retention of the flameproofing agents, e.g., the hydrochloric acid formed from the chlorination reaction would be converted to ammonium chloride, which would improve glow resistance; (b) by adjusting the contact time of the board with the halogen, in this case chlorine, either a surface treatment or a throughout flameproofing could be obtained but in all cases the board surface will be very fire resistant; (c) by the chlorination and ammoniation treatment the moisture content of the board is not increased and no extra water has to be driven off—this in contrast to fireproofing using soluble salts; (d) the neutralization reaction is strongly exothermic which will help in the subsequent drying of the board; (e) the flameproofing treatment would substantially improve the strength properties of the board (see Examples 8 and 9, above); (f) the effectiveness of the flameproofing treatment is not critically affected by water leaching (see Examples 8 and 9 above, bracketed figures in the tables), as the main flameproofing agents are an integral, insoluble part of the board (while a major portion of the soluble ammonium chloride salts (see (a) above) will be leached out, their role is mainly one of an "extra" agent tending to improve glow resistance), this in contrast to flameproofing, completely through use of soluble salts, in which case the flameproofing would be critically affected by water leaching.

Another important application would be the flameproofing of bark of wood insulating wool. The effects of halogenating (and neutralizing) these products is very striking, especially redwood bark wool (see Example 6, above). Here, using uncompacted samples, the untreated wool caught fire practically immediately whereas the treated sample did not catch fire even after prolonged exposure to the heated wires and when the heat was removed the incandescence stopped nearly immediately. By using ammonia as the neutralizing agent the treatment could be carried out with relative ease in a manner and with advantages similar to those mentioned above for wall board.

Another important application would be the flameproofing of paper and paperboard for the manufacture of flameproof wall paper, wrapping paper, laminating paper, building paper, cardboard etc. Example 10 above illustrates the halogenation and neutralization of various types of papers and paperboards, using techniques similar to those mentioned for wall board. The effectiveness of the flameproofing process, as tested by the Standard A.S.T.M. method, varies with several factors one of which is the caliper of the paper, and can be increased by the addition of fibrous material richer in phenolic substances (e.g. bark fibers) than the principal stock (e.g. groundwood and kraft).

What I claim as my invention is:

1. The process of flameproofing organic materials of a fibrous nature containing phenolic substances including at least one of the substances from the class consisting of lignins, tannins and phlobaphenes, comprising the step of halogenating said materials with, a gas consisting essentially of a halogen at a sufficient pressure to cause said gaseous halogen to enter said material and form halogen substituted phenolic substances therein, and subsequently drying said materials to form useful flameproofed articles containing said halogen-substituted phenolic substances.

2. The process as claimed in claim 1 wherein said halogen is chlorine.

3. A flameproofed product comprising a fibrous organic material treated by the process claimed in claim 1.

4. A flameproofed paper comprising fibrous organic material treated by the process claimed in claim 1.

5. A flameproofed fiberboard comprising fibrous organic material treated by the process claimed in claim 1.

6. A flameproofed shredded wood in the form of insulating wool comprising fibrous organic material treated by the process claimed in claim 1.

7. A flameproofed shredded bark in the form of insulating wool comprising fibrous organic material treated by the process claimed in claim 1.

8. The process of flameproofing cellulosic and related materials containing phenolic substances including at least one substance from the group consisting of lignins, tannins and phlobaphenes, comprising chlorinating said materials with a gas consisting essentially of chlorine at a sufficient pressure to cause said gaseous chlorine to enter said material and form halogen-substituted phenolic substances therein, washing out undesirable soluble acidic reaction products and subsequently drying said materials to form useful flameproofing articles containing said halogen-substituted phenolic substances.

9. The process of flameproofing cellulosic and related materials containing phenolic substances including at least one substance from the group consisting of lignins, tannins and phlobaphenes, comprising chlorinating said materials with a gas consisting essentially of chlorine at a sufficient pressure to cause said gaseous chlorine to enter said material and form halogen-substituted phenolic substances therein, neutralizing undesirable acidic reaction products with an alkaline substance and subsequently drying said materials to form useful flameproofed articles containing said halogen-substituted phenolic substances.

10. The process as claimed in claim 9 wherein said alkaline substance is gaseous ammonia.

11. The process of flameproofing cellulosic and related materials containing phenolic substances including at least one substance from the group consisting of lignins, tannins and phlobaphenes, comprising chlorinating said materials with a gas consisting essentially of chlorine at a sufficient pressure to cause said gaseous chlorine to enter said material and form halogen-substituted phenolic substances therein, washing out undesirable soluble acidic reaction products, neutralizing any remaining undesirable acidic reaction products with an alkaline substance, and subsequently drying said materials to form useful flameproofed articles containing said halogen-substituted phenolic substances.

12. The process of flameproofing and strengthening fiberboards containing phenolic substances including at least one substance from the class consisting of lignins, tannins and phlobaphenes, comprising the steps of chlorinating the wet board after it has left the press roll and forming section of the board machine with a gas consisting essentially of chlorine at a sufficient pressure to cause said gaseous chlorine to enter said wet board and form halogen-substituted phenolic substances therein, neutralizing undesirable acidic reaction products with gaseous ammonia, and subsequently drying said board to form a flameproofed board containing said halogen-substituted phenolic substances.

13. The process of flameproofing and strengthening fiberboards containing phenolic substances including at least one substance from the class consisting of lignins, tannins and phlobaphenes, comprising the steps of chlorinating the wet board after it has left the forming section of the board machine with a gas consisting essentially of chlorine at a sufficient pressure to cause said gaseous chlorine to enter said wet board and form halogen-substituted phenolic substances therein, thereafter pressing the board in the press roll section of the machine to remove a portion of undesirable soluble acidic reaction products, thereafter neutralizing the remaining undesirable acidic reaction products with gaseous ammonia, and subsequently drying said board to form a useful flameproofed board containing said halogen-substituted phenolic substances.

14. The process of flameproofing paper and paper boards containing phenolic substances including at least one substance from the class consisting of lignins, tannins and phlobaphenes, comprising the step of chlorinating the wet paper after it has left the press roll and forming section of the paper machine with a gas consisting essentially of chlorine at a sufficient pressure to cause said gaseous chlorine to enter said wet paper and form halogen-substituted phenolic substances therein, thereafter neutralizing undesirable acidic reaction products with gaseous ammonia and subsequently drying said paper to form useful flameproofed paper containing said halogen-substituted phenolic substances.

References Cited in the file of this patent

UNITED STATES PATENTS

| | | |
|---|---|---|
| 698,134 | Phillips | Apr. 22, 1902 |
| 1,843,465 | Traquair | Feb. 2, 1932 |
| 1,910,670 | Blaser | May 23, 1933 |
| 1,939,082 | Quinn | Dec. 12, 1933 |

FOREIGN PATENTS

| | | |
|---|---|---|
| 261,508 | Great Britain | Nov. 25, 1926 |
| 325,366 | Italy | Mar. 11, 1935 |
| 156,284 | Germany | June 10, 1939 |